United States Patent
Nagao (10) Patent No.: US 7,180,690 B2
(45) Date of Patent: Feb. 20, 2007

(54) LIGHT CONDENSING FILTER

(75) Inventor: Kimitoshi Nagao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/076,913

(22) Filed: Mar. 11, 2005

(65) Prior Publication Data

US 2005/0207035 A1 Sep. 22, 2005

(30) Foreign Application Priority Data

Mar. 16, 2004 (JP) .......................... P.2004-073969

(51) Int. Cl.
*G02B 5/04* (2006.01)
*G02B 27/10* (2006.01)

(52) U.S. Cl. .................. 359/837; 359/831; 359/625

(58) Field of Classification Search ............... 359/455, 359/625, 831, 837
See application file for complete search history.

(56) References Cited

U.S. PATENT DOCUMENTS

| | | | | |
|---|---|---|---|---|
| 71,475 | A | * | 11/1867 | Fitzgerald ................. 359/594 |
| 1,585,873 | A | * | 5/1926 | Pougher ................... 362/333 |
| 4,871,233 | A | * | 10/1989 | Sheiman ................... 359/464 |
| 5,471,348 | A | * | 11/1995 | Miller et al. .............. 359/837 |
| 5,771,328 | A | * | 6/1998 | Wortman et al. .......... 385/146 |
| 5,914,759 | A | * | 6/1999 | Higuchi et al. ............ 349/57 |
| 5,919,551 | A | * | 7/1999 | Cobb et al. ............... 428/156 |
| 5,999,685 | A | * | 12/1999 | Goto et al. ............... 385/146 |
| 6,081,376 | A | * | 6/2000 | Hansen et al. ............ 359/485 |
| 6,222,689 | B1 | * | 4/2001 | Higuchi et al. ........... 359/837 |
| 6,304,378 | B1 | * | 10/2001 | Clausen ................... 359/456 |
| 6,356,391 | B1 | * | 3/2002 | Gardiner et al. ......... 359/628 |
| 6,456,437 | B1 | * | 9/2002 | Lea et al. ................. 359/625 |
| 6,570,710 | B1 | * | 5/2003 | Nilsen et al. ............. 359/625 |
| 6,633,722 | B1 | * | 10/2003 | Kohara et al. ........... 385/146 |
| 6,845,212 | B2 | * | 1/2005 | Gardiner et al. ......... 385/146 |
| 6,854,855 | B2 | * | 2/2005 | Munro et al. ............ 362/620 |

FOREIGN PATENT DOCUMENTS

| JP | 8-262206 A | 10/1996 |
|---|---|---|
| JP | 11-109134 A | 4/1999 |

* cited by examiner

*Primary Examiner*—Ricky D. Shafer
(74) *Attorney, Agent, or Firm*—Sughrue Mion, PLLC (57) ABSTRACT

A light condensing filter has plural prisms formed on a surface of a flat substrate and on the opposite surface to the surface, and light from a light source is condensed by the plural prisms, wherein the plural prisms formed on the surface are designed in a linear shape extending in a specific direction on the surface and arranged in a direction perpendicular to the specific direction, the plural prisms formed on the opposite surface are designed in a linear shape extending in the direction perpendicular to the specific direction on the opposite surface and arranged in the specific direction, and the plural prisms formed on the surface and the plural prisms formed on the opposite surface are irregularly arranged.

13 Claims, 7 Drawing Sheets

LIGHT CONDENSING FILTER

This application is based on Japanese Patent application JP 2004-073969, filed Mar. 16, 2004, the entire content of which is hereby incorporated by reference. This claim for priority benefit is being filed concurrently with the filing of this application.

BACKGROUND OF THE INVENTION

1. Technical Field of the Invention

The present invention relates to a light condensing filter in which plural prisms are formed on a substrate and light from a light source is condensed by the plural prisms.

2. Description of the Related Art

A liquid crystal display device varies transmissivity or reflectivity to light by using electro-optical effects such as optical anisotropy, orientation, fluidity and dielectric anisotropy of liquid crystal molecules to thereby display images. This liquid crystal display device is designed to be thin and light and also it has low power consumption, so that it has been broadly used for personal computers, television sets, portable terminals, etc.

The liquid crystal display device comprises a light source for back light (cold cathode fluorescent lamp (CCFL)), a light guide plate for guiding light from the light source, a diffusion filter for diffusing light, a prism sheet for condensing the light from the light guide plate so that the light is incident to a liquid crystal layer, a liquid crystal display panel having the liquid crystal layer, etc. which are successively laminated. In the liquid crystal display device, the light from the light source is guided from the light guide plate to the diffusion film, and the light which is uniformly diffused by the diffusion film is condensed by the prism sheet and incident to the liquid crystal layer. With the prism sheet, the display brightness of the liquid crystal display device can be enhanced.

There is known a related art prism sheet in which plural prisms are regularly arranged on the surface and back surface of a flat substrate and the arrangement direction of prisms arranged on the surface is perpendicular to the arrangement direction of prisms arranged on the back surface (see JP-A-8-262206 and JP-A-11-109134).

Furthermore, there is also known a prism sheet in which plural prisms are irregularly arranged on the surface of a flat substrate (see Products catalog of Brightness-enhanced film "BEF-III series" produced by Sumitomo 3M Ltd., which is hereinafter referred to as non-patent document 1).

Figure 7:
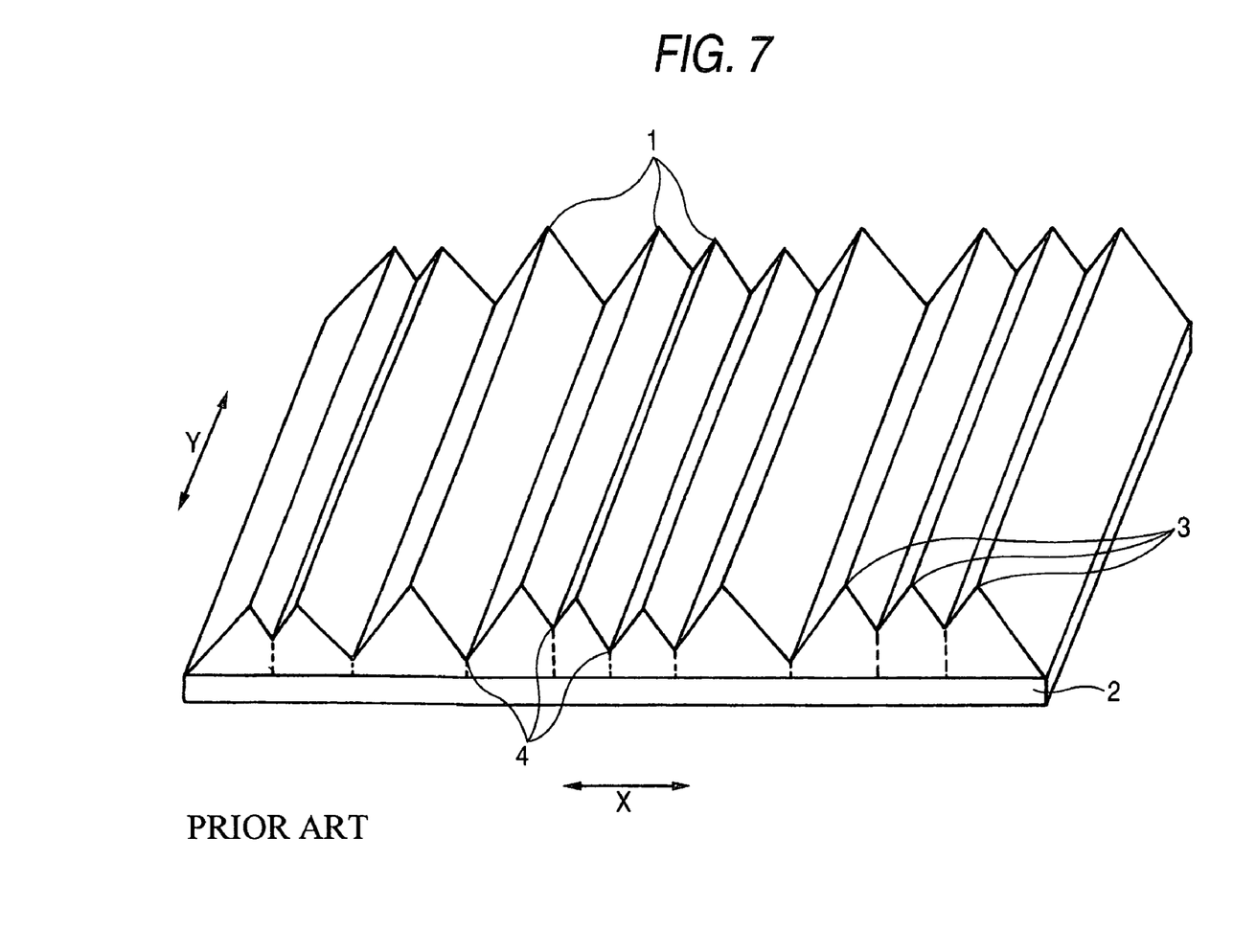
FIG. 7 is a perspective view showing the construction of a prism sheet described in the non-patent Document 1.

FIG. 7 is a perspective view showing the construction of the prism sheet described in the non-patent document 1. In the prism sheet of FIG. 7, plural prisms 1 having the same top angle (the angle of the top portion) are formed on the surface of the flat substrate 2 so as to be continuous in the X direction. In FIG. 7, each boundary line of the plural prisms 1 is represented by a broken line vertically-extending from a valley portion 4 between the respective prisms to the surface. The height of the top portion 3 of each prism from the surface and the height of the valley portion 4 between the respective prisms from the surface are dispersed, so that the arrangement pitch of the plural prisms 1 (the distance between the midpoints in the width direction of two adjacent prisms in an X-direction) is dispersed and the plural prisms 1 are irregularly arranged in the X-direction.

According to the prism sheet of FIG. 7, since the arrangement of the plural prisms 1 is irregular, interference with the arrangement of display pixels, color filters or the like of a liquid crystal display device having this prism sheet mounted therein can be prevented, and thus moiré can be suppressed. The display brightness of the liquid crystal display device can be enhanced by using two prism sheets of FIG. 7. In this case, the two prism sheets are disposed between the light guide plate and the liquid crystal layer in the liquid crystal display device so that the arrangement directions of the plural prisms of the prism sheets are perpendicular to each other.

According to the prism sheets described in JP-A-8-262206 and JP-A-11-109134, the plural prisms are arranged on the surface and the back surface, and thus the light condensing effect is enhanced. However, the prisms formed on the surface and the back surface are regularly arranged, and thus moiré occurs in the liquid crystal display device having this prism sheet mounted therein.

According to the prism sheet described in the non-patent document 1, the heights of the top portions of the plural prisms 1 from the surface are not set to be equal to one another. Accordingly, when optical film such as a diffusion plate or the like or a liquid crystal layer is disposed on the plural prisms 1 of this prism sheet, flatness of the optical film or the liquid crystal layer is lost, and thus there is a problem that unevenness of light occurs or the like.

The present invention has been implemented in view of the foregoing situation.

SUMMARY OF THE INVENTION

An object of the invention is to provide a light condensing filter which can suppress moire in a liquid crystal display device with enhancing a light condensing effect.

Furthermore, the present invention has another object to provide a light condensing filter having high flatness which can suppress moiré in a liquid crystal display device.

A light condensing filter according to the present invention has plural prisms formed on a surface of a flat substrate and on the opposite surface to the surface, and light from a light source is condensed by the plural prisms, wherein the plural prisms formed on the surface are designed in a linear shape extending in a specific direction on the surface and arranged in a direction perpendicular to the specific direction, the plural prisms formed on the opposite surface are designed in a linear shape extending in the direction perpendicular to the specific direction on the opposite surface and arranged in the specific direction, and the plural prisms formed on the surface and the plural prisms formed on the opposite surface are irregularly arranged.

In this construction, the plural prisms are irregularly arranged on the surface and opposite surface of the same flat substrate, and thus when the light condensing filter is provided between the light guide plate and the liquid crystal layer of the liquid crystal display device, moire can be suppressed with enhancing the condensing effect of light from the light source.

In the light condensing filter of the present invention, an irregularity degree of the arrangement of the plural prisms formed on the surface and an irregularity degree of the arrangement of the plural prisms formed on the opposite surface are preferably different from each other.

According to this construction, moiré can be more effectively suppressed.

A light condensing filter of the present invention has plural prisms formed on a surface of a flat substrate and light from a light source is condensed by the plural prisms, wherein the plural prisms formed on the surface are designed in a linear shape extending in a specific direction on the surface and irregularly arranged in a direction perpendicular to the specific direction, and the heights of the top portions of the respective prisms from the surface are set to be equal to one another.

According to this construction, the plural prisms formed on the surface are irregularly arranged, and thus when the light condensing filter is provided between the light guide plate and the liquid crystal layer of the liquid crystal display device, moiré in the liquid crystal display device can be suppressed. Furthermore, the heights of the top portions of the plural prisms from the surface are set to be equal to one another, and thus the flatness of the light condensing filter can be enhanced. When the light condensing filter is provided between the light guide plate and the liquid crystal layer of the liquid crystal display device, unevenness of display brightness can be eliminated. Furthermore, the light condensing filter having high flatness can be easily installed in the liquid crystal display device, and thus the manufacturing cost of the liquid crystal display device can be reduced.

Furthermore, in the light condensing filter of the present invention, it is preferable that the plural prisms are continuously formed in the arrangement direction, the plural prisms has the same top angle, and the heights of the respective valley portions sandwiched by respective adjacent two prisms of the plural prisms from the surface is dispersive.

According to this construction, the plural prisms have the same top angle and no gap occurs between the plural prisms, so that the light can be efficiently condensed and the light condensing effect can be enhanced. Furthermore, the heights of the respective valley portions sandwiched between the respective adjacent two prisms of the plural prisms from the surface are dispersive to thereby implement the irregular arrangement. Therefore, when the light condensing filter is provided between the light guide plate and the liquid crystal layer of the liquid crystal display device having the light source, moiré can be suppressed with enhancing the condensing effect of light from the light source.

According to the light condensing filter of the present invention, plural prisms are preferably further formed on the opposite surface to the surface, and the arrangement direction of the plural prisms formed on the opposite surface is perpendicular to the arrangement direction of plural prisms formed on the surface.

According to this construction, the plural prisms are formed on the surface and the opposite surface of the same flat substrate, and thus the light condensing effect can be further enhanced.

According to the present invention, there can be provided a light condensing filter which can suppress moiré in a liquid crystal display device with enhancing a light condensing effect. Furthermore, according to the present invention, there can be provided a light condensing filter having high flatness which can suppress moiré in a liquid crystal display device.

BRIEF DESCRIPTION OF THE DRAWINGS

FIGS. 2A and 2B are diagrams showing the construction of a light condensing filter according to a first embodiment of the present invention, wherein

DETAILED DESCRIPTION OF THE INVENTION

Embodiments of the present invention will be described hereunder with reference to the accompanying drawings.

Figure 1:
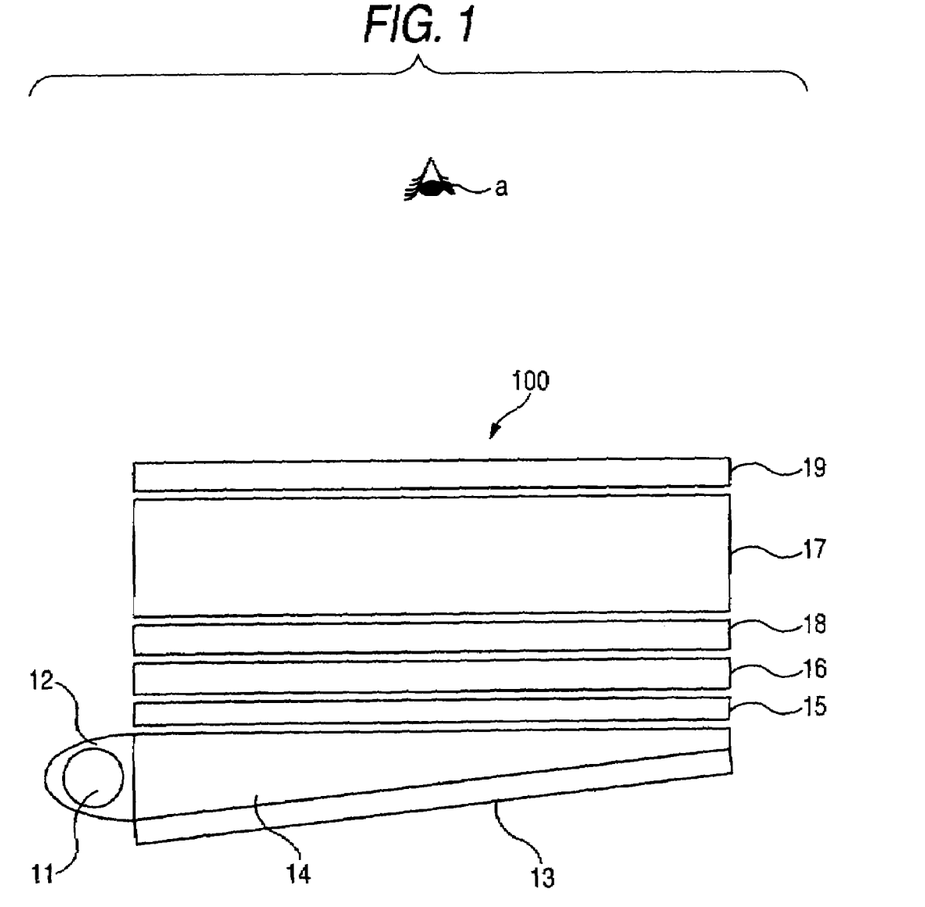
FIG. 1 is a cross-sectional view showing a liquid crystal display device to describe an embodiment of the present invention.

FIG. 1 is a cross-sectional view showing a liquid crystal display device according to an embodiment of the present invention.

A liquid crystal display device 100 is equipped with a light source 11 comprising a cold cathode fluorescent lamp (CCFL) or the like for illuminating a liquid crystal layer 17 from the back side thereof, a reflection plate 12 for reflecting light from the light source 11, a light guide plate 14 for guiding light from the light source 11 and light reflected from the reflection plate 12 toward a liquid crystal layer 17, a diffusion plate (or reflection plate) 13 for returning light emitted from the inside of the light guide plate 14 into the light guide plate 14 or to the liquid crystal layer 17, a diffusion film 15 for diffusing light emitted from the light guide plate 14, a light condensing filter 16 for condensing light diffused by the diffusion film 15 and making the condensed light incident to the liquid crystal layer 17, polarizing plates 18 and 19, and the liquid crystal layer 17. As shown in FIG. 1, the diffusion plate (or reflection plate) 13, the light guide plate 14, the diffusion film 15, the light condensing filter 16, the polarizing plate 18, the liquid crystal layer 17 and the polarizing plate 19 are laminated in this order.

In FIG. 1, the description will be made by applying to a liquid crystal display device using a light guide plate in which a cold cathode fluorescent lamp (CCFL) is used as a light source, however, the liquid crystal display device may use a flat type light source such as LED, organic EL, inorganic EL or the like.

The light condensing filter 16 is formed by forming plural prisms of photopolymer or the like on the surface of a transparent flat substrate such as a film, a sheet or the like, and it condenses light from the light source 11 by these plural prisms 11. The transparent flat substrate is formed of raw material such as glass, plastic or the like.

A specific construction of the light condensing filter 16 of FIG. 1 will be described by first and second embodiments.

(First Embodiment)

Figure 2A:
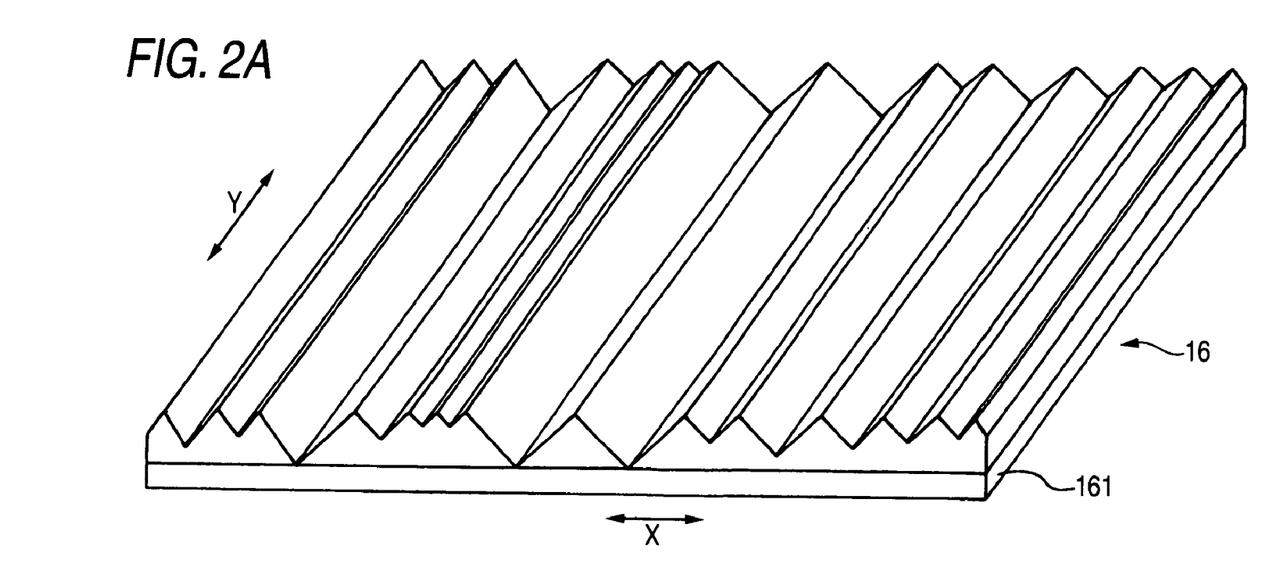
FIG. 2A is a perspective view and FIG. 2B is a view taken from Y-direction.
Figure 2B:
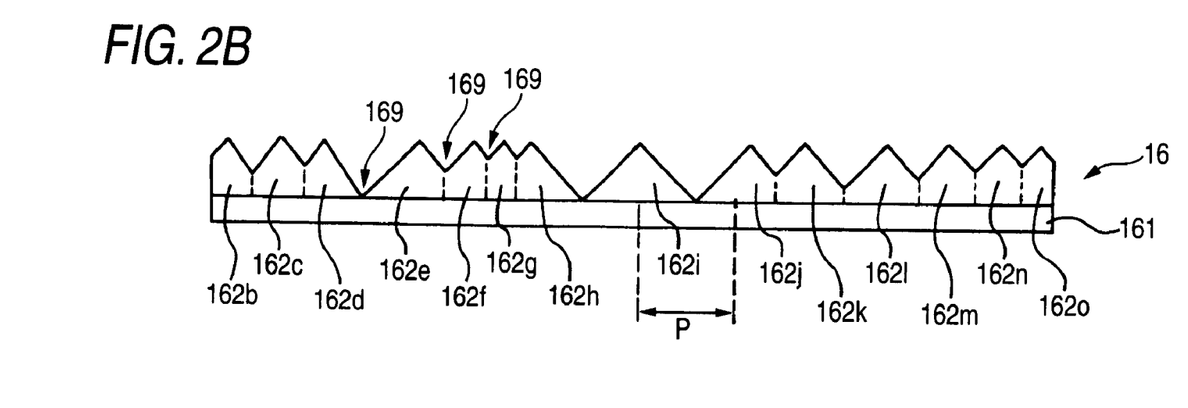

FIGS. 2A and 2B are diagrams showing the construction of the light condensing filter to describe the first embodiment of the present invention, wherein FIG. 2A is a perspective view, and FIG. 2B is a view taken from in a Y-direction.

In the light condensing filter 16 of 2B, plural prisms 162*b* to 162*o* are continuously formed in the X-direction on one face of the surface of a transparent flat substrate 161 such as a film, a sheet or the like. The transparent flat substrate 161 is formed by using raw material such as glass, plastic or the like. The transparent flat substrate 161 and the plural prisms 162b to 162o may be formed integrally with each other. In this embodiment, the boundary lines of the respective prisms 162b to 162o are represented by vertical lines (in FIG. 2B, represented by broken lines) extending from the respective valley portions 169 (only some of them are represented by reference numeral) of the prisms 162b to 162o to the surface of the transparent flat substrate 1601.

The light condensing filter 16 is disposed so that the opposite surface to the surface on which the prisms 162b to 162o are formed faces the light guide plate 14 (the top portions of the prisms 162b to 162o face the liquid crystal layer 17), that is, the light guide plate 14 exists at the lower side of FIG. 2B. In FIGS. 2A and 2B, only fourteen prisms are illustrated on the surface of the light condensing filter 16, however, actually, many prisms are continuously formed between the prism 162d and the prism 162e and between the prism 162l and the prism 162m.

Each of the prisms 162b to 162o is designed in a linear shape extending in a specific direction (Y-direction of FIG. 2A) on the surface of the light condensing filter 16, and the shape thereof is set to polygonal column-shape. The prisms 162b to 162o are irregularly arranged in a direction (X-direction of FIG. 2) perpendicular to the specific direction. The arrangement pitch P of the prisms 162b to 162o (the distance between the midpoints in the prism width direction of respective adjacent two prisms arranged in the X-direction) is not uniform, but it is dispersed, so that the prisms are irregularly arranged.

The degree of irregularity of the arrangement of the prisms 162b to 162o will be described.

The average value d of the distances in the X-direction between the respective top portions of the prisms 162b to 162o is set to be equal to or smaller than the arrangement pitch in the X-direction of display pixels or color filters formed in the liquid crystal layer 17. For example, d is set to a value in the range from 5 μm to 500 μm.

At this time, the position of the top portion of each of the prisms 162b to 162o (the coordinate in the X-direction when the top portion of the prism 162b is set as a starting point) Xi (i represents a positive integer) is determined by the following equation (1).

$$Xi = \langle xi \rangle + \Delta Xi \quad (1)$$

wherein, $\langle xi \rangle = i \times d$, $\Delta Xi = (d/3) \times Ri$

In the equation (1), $\langle xi \rangle$ represents the average position coordinate of the top portion of the i-th prism (the position of the prism 162b is set to a zeroth position).

Ri represents a random number. Ri is a random number having a value of $-0.1 \leq Ri \leq 1.0$.

$\Delta Xi$ represents a random positional variation amount, and it is a numerical value achieved by giving a random fluctuation to the above "d" by using a random number Ri such as a normal random number or the like. "3" of the denominator in the equation of $\Delta Xi$ is a constant so that the top portions of the prisms 162b to 162o are not set to the same position, and this value is preferably set to be larger than 2 and smaller than 100.

The position of each top portion of the prisms 162b to 162o (all the heights of the respective top portions from the surface of the transparent flat substrate 161 is set to be equal to one another) is determined by the above equation. In the cross-sectional profile, two lines are downwardly drawn from each top portion to the transparent flat substrate 161 so that the two lines form a predetermined top angle. At this time, when adjacent prisms collide against each other, the collision position becomes the valley portion 169 between the two prisms. By forming the prisms 162b to 162o as described above, the arrangement pitch P of the prisms 162b to 162o can be dispersed, so that the prisms 162b to 162o can be irregularly arranged.

The heights of the respective top portions of the prisms 162b to 162o from the surface of the transparent flat substrate 161 are equal to one another. The respective top angles (the angles of the top portions) of the prisms 162b to 162o are equal to one another, and the angles are set in the range from 45° to 150°.

The heights of the respective valley portions 169 sandwiched by the respective adjacent two prisms of the prisms 162b to 162o from the surface of the transparent flat substrate 161 are dispersive.

As described above, with respect to the light condensing filter 16, the prisms 162b to 162o are continuously formed so that the heights of the valley portions 169 sandwiched by the respective two adjacent prisms of the prisms 162b to 162o from the surface of the transparent flat substrate 161 are dispersed from one another under the condition that the heights of the respective top portions of the prisms 162b to 162o from the surface of the transparent flat substrate 161 are equal to one another and also the respective top angles of the prisms 162b to 162o are equal to one another, whereby the irregularity of the arrangement of the prisms 162b to 162o is implemented.

In the liquid crystal display device 100 having the light condensing filter 16 described above, light incident from the light source 11 into the light guide plate is uniformly diffused or reflected by the diffusion plate (or reflection plate) 13 corresponding to the lower surface of the light guide plate 14. The light is emitted from the light emission face corresponding to the upper surface of the light guide plate 14 to the outside at a smaller angle than the critical angle of the total reflection, and then immediately incident to the diffusion film 15 to be diffused in multiple directions. The light thus diffused is incident to the light condensing filter 16, condensed by the prisms 162b to 162o and then incident to the liquid crystal layer 17, whereby the display brightness of the liquid crystal display device 100 can be enhanced.

According to the light condensing filter 16, the arrangement of the prisms 162b to 162o is irregular, and thus there can be suppressed moiré occurring between the arrangement of the prisms 162b to 162o and the arrangement of the display pixels of the liquid crystal device 100 or the arrangement of color filters.

Furthermore, according to the light condensing filter 16, the top portions of the prisms 162b to 162o are equal in height to one another, and thus the flatness of the light condensing filter 16 can be secured. If the flatness of the light condensing filter 16 is low, slack or the like occurs between the light condensing filter 16 and another member when the light condensing filter 16 is installed in the liquid crystal display device 100, and thus unevenness in brightness may occur in the liquid crystal display device 100. However, when the flatness of the light condensing filter 16 is secured, the unevenness in brightness of the liquid crystal display device 100 can be suppressed.

According to the light condensing filter 16, the prisms 162b to 162o are continuously formed, and thus no gap occurs between the respective prisms 162b to 162c. Therefore, the light from the light source 11 can be efficiently condensed.

Furthermore, according to the light condensing filter 16, the top angles of the prisms 162b to 162o are equal to one another. Therefore, the light condensing effect of the light condensing filter 16 can be enhanced, and the display brightness of the liquid crystal display device 100 can be enhanced.

Still furthermore, this embodiment is designed so that under the condition that the heights of the top portions of the prisms 162b to 162o are equal to one another, the prisms 162b to 162o are continuously formed and the top angles of the prisms 162b to 162o are equal to one another, the heights of the valley portions 169 between the respective adjacent prisms 162b to 162o are dispersed from one another in order to irregularly arrange the prisms 162b to 162o. With this construction, a light condensing filter having effects of moiré suppression, enhancement of the light condensing effect and securement of flatness can be implemented.

Figure 3A:
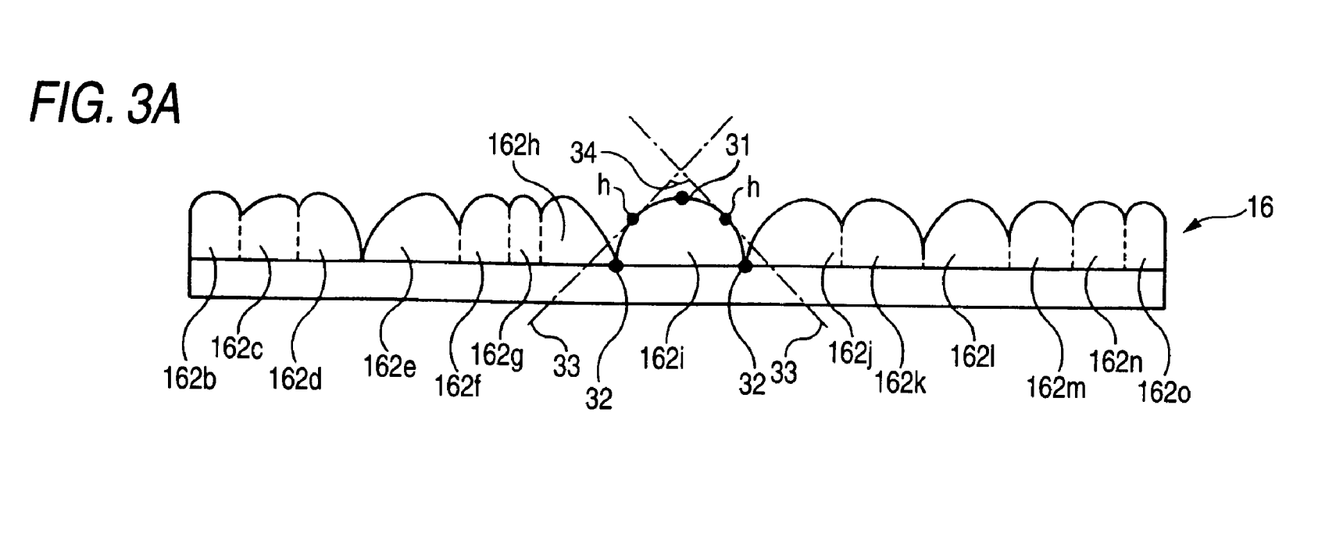
FIG. 3 is a diagram showing a modification of the light condensing filter according to the first embodiment of the present invention.
Figure 3B:
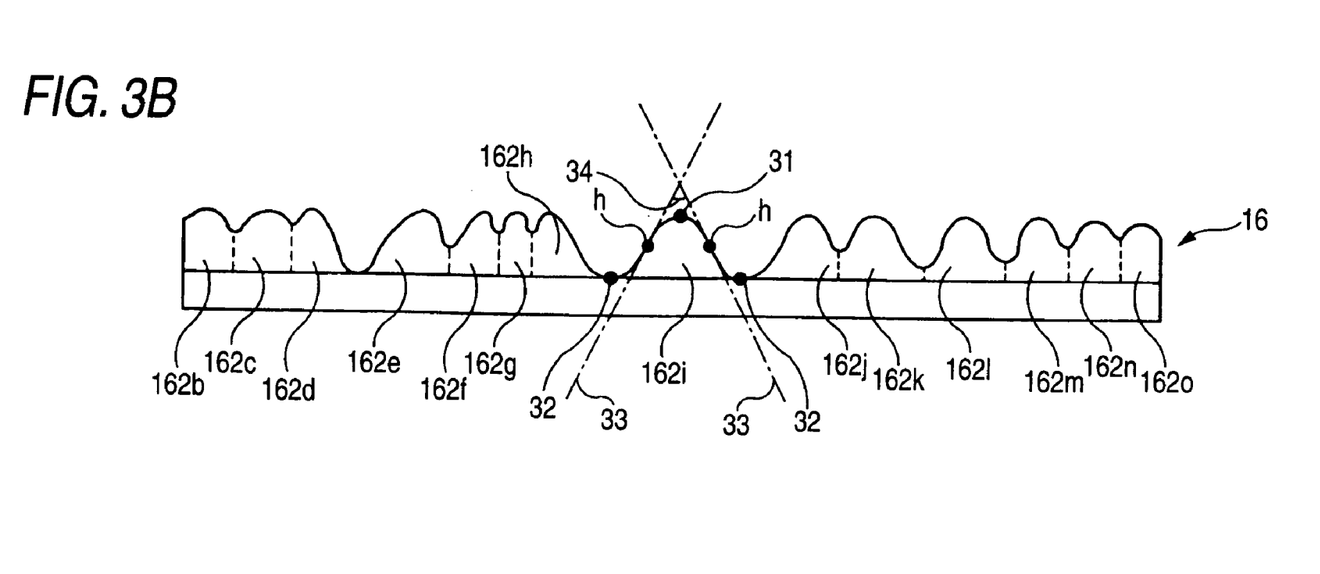

In this embodiment, the shape of the prisms 162b to 162o is set to a polygonal-column shape, however, the shape of the prisms is not limited to the polygonal-column shape. For example, in FIGS. 2A and 2B, the projecting portions of the prisms 162b to 162o may be designed to have curved surfaces (see FIG. 3A), or the projecting portions and valley portions 169 of the prisms 162b to 162o may be designed to have curved surfaces (see FIG. 3B). In the case of FIGS. 3A and 3B, with respect to the top angles of the prisms 162b to 162o, the description will be made by using the prism 162i as a representative. The top angle of the prism 162i is defined as the intersecting angle 34 between two tangent lines 33 at the two midpoints h on curved lines which connect the top portion 31 of the prisms 162i to the two valley portions 32 between the prism 162i and each of the adjacent prisms.

In this embodiment, the top angles of the prisms 162b to 162o are equal to one another, the prisms 162b to 162o are continuously formed and the heights of the valley portions between the prisms 162b to 162o are dispersed from one another. However, in order to secure the flatness of the light condensing filter 16 and suppress moiré of the liquid crystal display device 100, it is sufficient to merely adopt such a construction that the heights of the top portions of the prisms 162b to 162o from the surface of the transparent flat substrate 161 are equal to one another and the prisms 162b to 162o are irregularly arranged. For example, if there is adopted the construction that the prisms 162b to 162o are not continuously formed (the prisms are arranged with gaps in the X-direction), it would be possible to irregularly arrange the prisms 162b to 162o even when the heights of the valley portions 169 between the prisms 162b to 162o are not dispersed, the top angles of the prisms 162b to 162o are not set to be equal to one another and the heights of the top portions of the prisms 162b to 162o from the surface of the transparent flat substrate 161 are set to be equal to one another.

(Second Embodiment)

In a light condensing filter of a second embodiment of the present invention, the light condensing filter 16 of the first embodiment becomes the following light condensing filter 16b.

Figure 4:
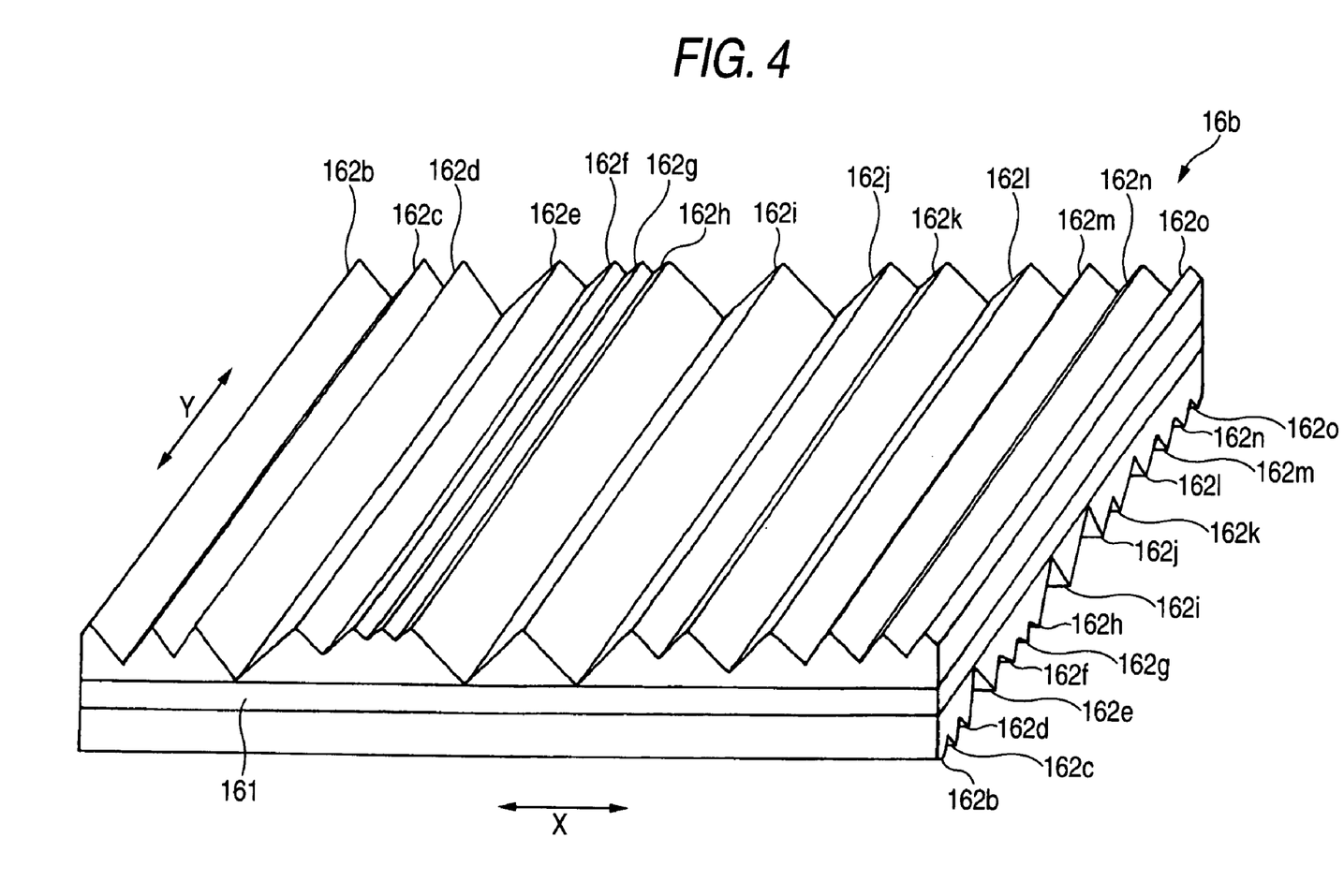
FIG. 4 is a diagram showing the construction of a light condensing filter according to a second embodiment of the present invention.

FIG. 4 is a perspective view showing the construction of a light condensing filter of the second embodiment of the present invention.

The light condensing filter 16b of FIG. 4 is achieved by forming the prisms 162b to 162o having the same construction as the first embodiment on the opposite surface to the surface of the transparent flat substrate 161. However, the arrangement direction of the prisms 162b to 162o formed on the opposite surface of the transparent flat substrate 161 is perpendicular to the arrangement direction (X-direction) of the prisms 162b to 162o formed on the surface of the transparent flat substrate 161.

With this construction, the light incident to the light condensing filter 16b can be efficiently condensed, and thus the brightness of the liquid crystal display device 100 can be more enhanced.

Furthermore, occurrence of moiré can be more suppressed as compared with a case where the prisms 162b to 162o are regularly arranged on both the surfaces of the transparent flat substrate 161.

In the above embodiment, the prisms 162b to 162o are formed on the surface and the opposite surface of the same transparent flat substrate 161 to implement one light condensing filter 16b. However, the same effect as the light condensing filter 16b can be achieved by using two light condensing filters 16 shown in FIGS. 2A and 2B. In this case, the light condensing filter 16 is further disposed between the light condensing filter 16 of FIGS. 2A and 2B and the light guide plate 14 (for example, just below the light condensing filter 16) so that the top portions of the prisms 162b to 162o of this light condensing filter 16 face the light guide plate 14.

In such a case, two interfaces with air exist between the two light condensing filters 16, and thus the loss of light from the light source 11 is great. However, according to the light condensing filter 16b shown in FIG. 4, the prisms 162b to 162o are formed on the surface and opposite surface of the same transparent flat substrate 161, and thus light emitted from the prisms 162b to 162o formed on the opposite surface is incident to the prisms 162b to 162o formed on the surface without passing through any interface with air. Accordingly, the loss of light from the light source 11 is little, and the brightness of the liquid crystal display device 100 can be more enhanced. Furthermore, according to the light condensing filter 16b shown in FIG. 4, the manufacturing cost of the liquid crystal display device 100 can be more reduced as compared with a case where two light condensing filters 16 are used. The two light condensing filters 16 may be provided in the liquid crystal display device 100 so that the top portions of the respective prisms of the light condensing filters face each other.

In the above embodiment, the same prisms 162b to 162o are formed on the surface and opposite surface of the transparent flat substrate 161. However, the irregularity degree of the arrangement of the prisms 162b to 162o formed on the surface may be different from the irregularity degree of the arrangement of the prisms 162b to 162o formed on the opposite surface. For example, the value of "d" in the prisms 162b to 162o formed on the surface may be different from the value of "d" of the prisms 162b to 162o formed on the opposite surface. With this construction, the moiré suppressing effect can be more enhanced.

In this embodiment, the heights of the top portions of the prisms 162b to 162o from the surface of the transparent flat substrate 161 are set to be equal to one another, the top angles of the respective prisms 162b to 162o are set to be equal to one another, the prisms 162b to 162o are continuously formed and the heights of the valley portions 169 between the prisms 162b to 162o are dispersed. However, for the purpose of suppressing moiré of the liquid crystal display device 100, it would be sufficient at the very least if the prisms 162b to 162o are irregularly arranged. For example, if there is adopted the construction in which the prisms 162b to 162o are not continuously formed (i.e., the prisms 162b to 162o are arranged with gaps), it would be possible to irregularly arrange the prisms 162b to 162o even when the heights of the valley portions 169 between the prisms 162*b* to 162*o* are not dispersed, the heights of the top portions of the prisms 162*b* to 162*o* from the surface of the transparent flat substrate 161 are not equal to one another and the top angles of the prisms 162*b* to 162*o* are not set to be equal to one another.

In the first and second embodiments, the top angle of each of the prisms 162*b* to 162*o* is set in the range from 45° to 150°, however, this angle is particularly preferably set in the range from 60° to 120°.

Figure 5:
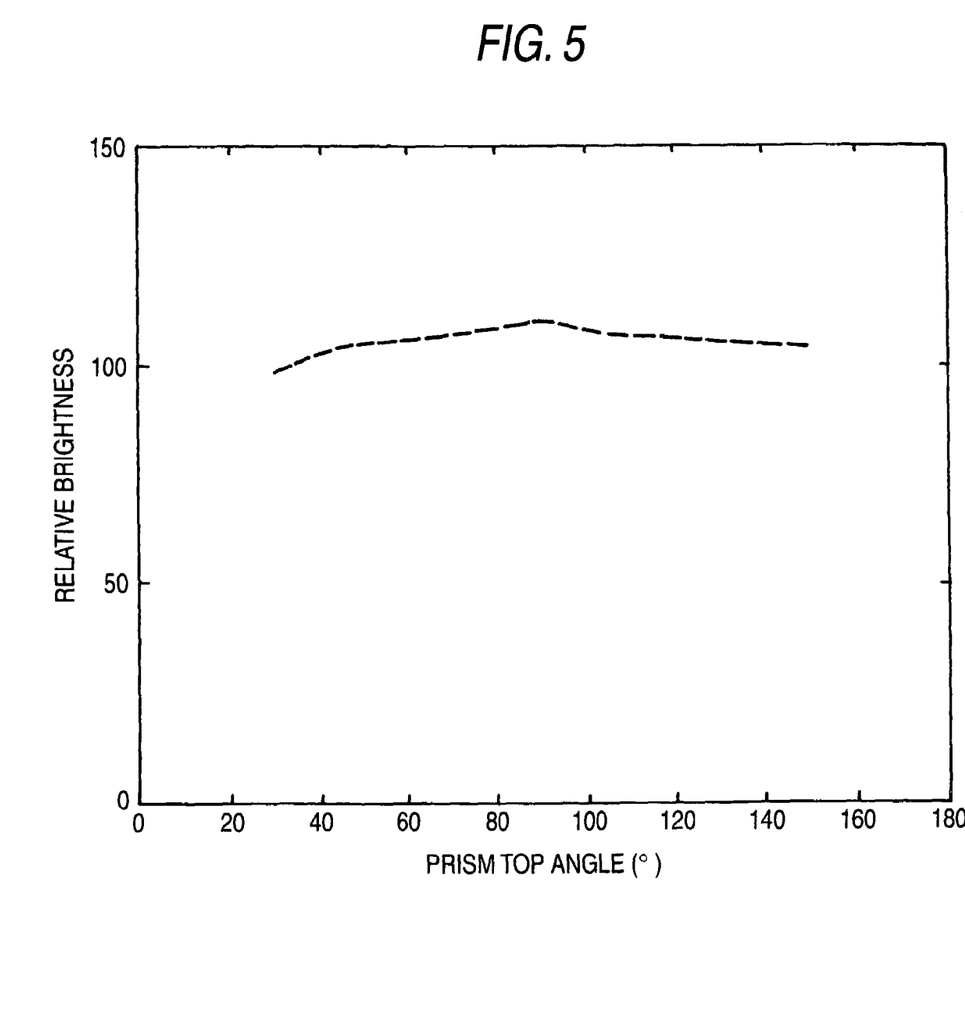
FIG. 5 is a diagram showing the relationship between the angle of prisms of the light condensing filter and the relative brightness to describe the embodiments of the present invention.

FIG. 5 is a diagram showing the relationship between the top angle of each of the prisms 162*b* to 162*o* of the light condensing filter described in the first and second embodiments and the relative light intensity (relative brightness I) of the light condensing filter described in the first and second embodiments. As shown in FIG. 5, the relative brightness I is large particularly in the range from 60° to 120° out of the range from 45° to 150°. Therefore, the light condensing effect can be more enhanced by setting the top angle of each of the prisms 162*b* to 162*o* to a value in the range from 60° to 120°.

Figure 6:
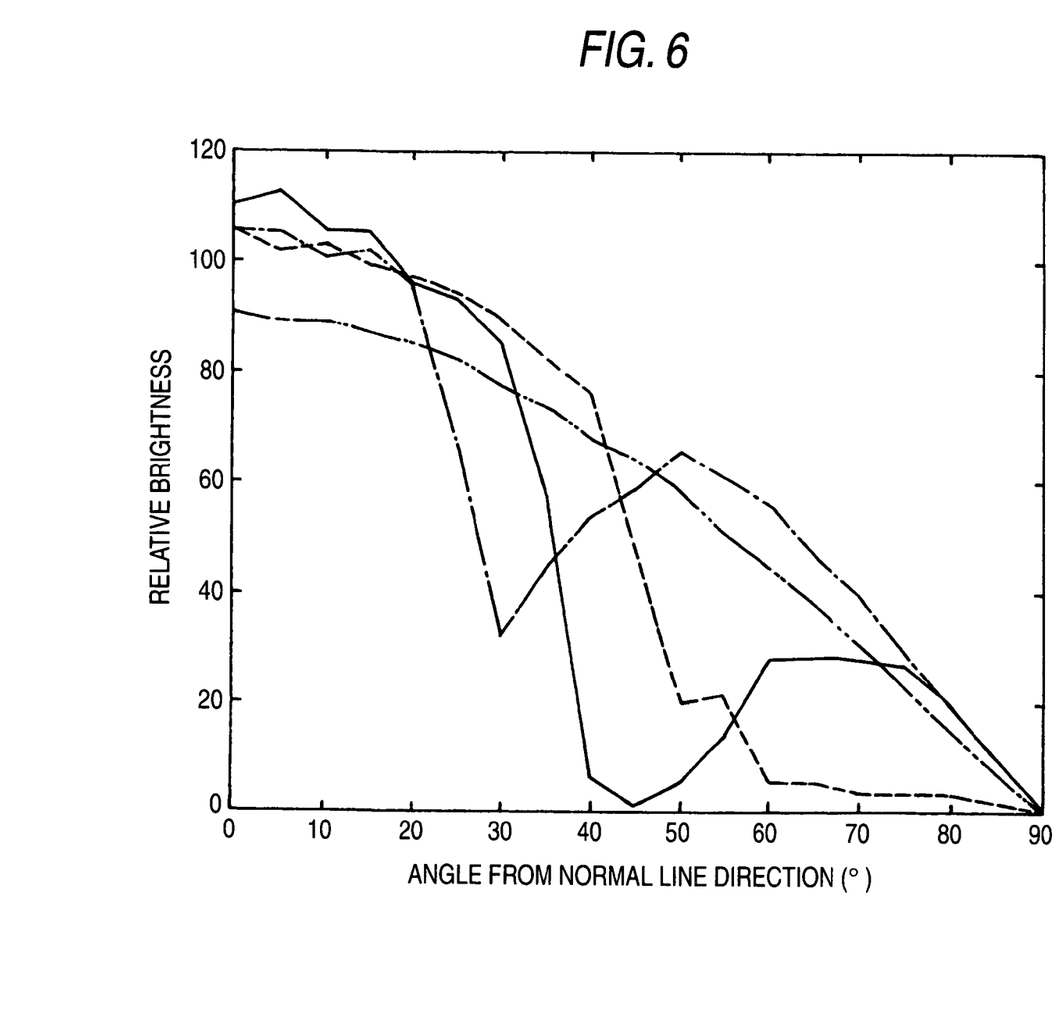
FIG. 6 is a diagram showing a light condensing effect of the light condensing filter to describ the embodiments of the present invention.

FIG. 6 is a diagram showing the relationship between an angle (0° to 90°) from a normal line direction when the normal line direction of the liquid crystal display device 100 is set to 0° and the relative brightness of the light condensing filter in the first and second embodiments when the top angle of each of the prisms 162*b* to 162*o* of the light condensing filter of the first and second embodiments is set to 60°, 90° and 120° and also no light condensing filter 16 is provided. As shown in FIG. 6, it is apparent that when the angle from the normal line direction is set in the range from 0° to 20°, the relative brightness I when the top angle of each of the prisms 162*b* to 162*o* is equal to 60°, 90° and 120° is larger than when no light condensing filter 16 is provided, and the light condensing effect to the normal line direction is high.

What is claimed is:

1. A light condensing filter having plural prisms on a surface of a flat substrate and on an opposite surface to the surface, light from a light source being condensed by the plural prisms,
wherein the plural prisms on the surface each has a linear shape extending in a first direction and the plural prisms on the surface have an irregular arrangement in a second direction perpendicular to the first direction,
the plural prisms on the opposite surface each has a linear shape extending in the second direction and the plural prisms on the opposite surface have an irregular arrangement in the first direction.

2. The light condensing filter according to claim 1, wherein an irregularity degree of the irregular arrangement of the plural prisms on the surface and an irregularity degree of the irregular arrangement of the plural prisms on the opposite surface are different from each other.

3. The light condensing filter according to claim 1, wherein the plural prisms each is a polygonal-columnar shape.

4. The light condensing filter according to claim 1, wherein the plural prisms each is a projecting portion having a curved surface.

5. The light condensing filter according to claim 1, wherein the plural prisms each is a projecting portion having a curved surface and a valley portion having a curved surface.

6. A light condensing filter having plural prisms on a first surface of a flat substrate, light from a light source being condensed by the plural prisms,
wherein the plural prisms on the first surface each has a linear shape extending in a first direction on the first surface and a same top angle and the plural prisms have an irregular arrangement in a continuous way in a second direction perpendicular to the first direction, and
the heights of the top portions of the respective prisms from the first surface are set to be equal to one another, and
the heights of the respective valley portions sandwiched by respective adjacent two prisms of the plural prisms from the surface are dispersive in that the position of the top portion of each of the prisms is random and a pitch P, which is the distance between the midpoints in the prism width direction of respective adjacent two prisms in the second direction, is dispersed so that the prisms are irregularly arranged.

7. The light condensing filter according to claim 6, wherein the top angle is from 45° to 150°.

8. The light condensing filter according to claim 7, wherein the top angle is from 60° to 120°.

9. The light condensing filter according to claim 6, wherein the light condensing filter has plural prisms further on a second surface opposite to the first surface of the flat substrate, and
the plural prisms on the second surface have an arrangement in the first direction.

10. The light condensing filter according to claim 9, wherein the plural prisms on the second surface have an irregular arrangement in a continuous way and each has a same top angle, and
the heights of the respective valley portions sandwiched by respective adjacent two prisms of the plural prisms from the second surface are dispersive in that the position of the top portion of each of the prisms is random and a pitch P, which is the distance between the midpoints in the prism width direction of respective adjacent two prisms in the second direction, is dispersed so that the prisms are irregularly arranged.

11. The light condensing filter according to claim 10, wherein the top angle is from 45° to 150°.

12. The light condensing filter according to claim 11, wherein the top angle is from 60° to 120°.

13. The light condensing filter according to claim 6, wherein the position of the top portion of each of the prisms is determined by the following equation (1):

$$Xi = <xi> + \Delta Xi \quad (1)$$

wherein, $<xi> = i \times d$ and $\Delta Xi = (d/3) \times Ri$;
Xi represents a coordinate of the top portion of the i-th prism in the second direction;
$<xi>$ represents the average position coordinate of the top portion of the i-th prism in the second direction;
d is the average value of the distances in the second direction between the top portions of the prisms; and
Ri is a random number having a value of $-0.1 \leq Ri \leq 1.0$.

* * * * *